United States Patent [19]

Kuno et al.

[11] Patent Number: 4,458,270

[45] Date of Patent: Jul. 3, 1984

[54] NEGATIVE TO POSITIVE IMAGE CONVERTING APPARATUS

[75] Inventors: Osamu Kuno, Atsugi; Tooru Takamiya, Yokohama, both of Japan

[73] Assignee: Sony Corporation, Tokyo, Japan

[21] Appl. No.: 370,402

[22] Filed: Apr. 21, 1982

[30] Foreign Application Priority Data

May 6, 1981 [JP] Japan .............................. 56-65317[U]

[51] Int. Cl.³ .......................... H04N 5/26; H04N 5/30
[52] U.S. Cl. ..................................... 358/225; 358/229
[58] Field of Search ................... 358/54, 93, 111, 209, 358/215, 216, 217, 214, 225, 226, 229, 294, 345, 83, 102

[56] References Cited

U.S. PATENT DOCUMENTS 2,854,901 10/1958 Fathauer .............................. 358/226
3,283,071 11/1966 Rose et al. ............................. 358/93
3,814,853 6/1974 Lardeau .............................. 358/226

Primary Examiner—John C. Martin
Assistant Examiner—Jeffrey D. Sutherland
Attorney, Agent, or Firm—Hill, Van Santen, Steadman & Simpson

[57] ABSTRACT

A negative to positive image converting apparatus comprising a video camera mounted detachably on one end of a base member, a housing mounted onto and substantially at right angles to the other end of base member, the housing comprising a lamp housing and a mirror housing, a color filter means disposed between the lamp housing and the mirror housing, projecting guide pins for guiding a film holder over an aperture in the mirror housing. In use light is projected through a negative in the film holder and via a mirror in the mirror housing to the video camera. The video camera has a negative to positive inversion switch so that a positive output video signal can be obtained.

6 Claims, 12 Drawing Figures

NEGATIVE TO POSITIVE IMAGE CONVERTING APPARATUS

BACKGROUND OF THE INVENTION

1. Field of the Invention

This invention relates to negative to positive image converting apparatus.

2. Description of the Prior Art

Known apparatus for converting film stills into video signals for recording or presentation on television have the disadvantage that they are bulky, require the use of powerful projection lamps, have problems with heat dissipation, and have cumbersome film holder units.

SUMMARY OF THE INVENTION

One object of the present invention is to provide an improved image converting apparatus for converting film stills into video signals.

Another object of the present invention is to provide an image converting apparatus having an improved provision for film holder units.

Another object of the present invention is to provide an image converting apparatus of a compact type.

According to the present invention there is provided a negative to positive image converting apparatus comprising:

a base member having first and second ends, said first end having provision for mounting a video camera thereon;

a housing mounted substantially as right angles to said second end of said base member, said housing comprising a lamp housing wherein a lamp holder is disposed, a mirror housing wherein a mirror is disposed for reflecting light originating from said lamp housing to said video camera, and a space between said lamp housing and said mirror housing into which a negative film can be inserted.

The above, and other objects, features and advantages of the invention will be apparent from the following detailed description of illustrative embodiments which is to be read in connection with the accompanying drawings.

DESCRIPTION OF THE PREFERRED EMBODIMENTS

Figure 1:
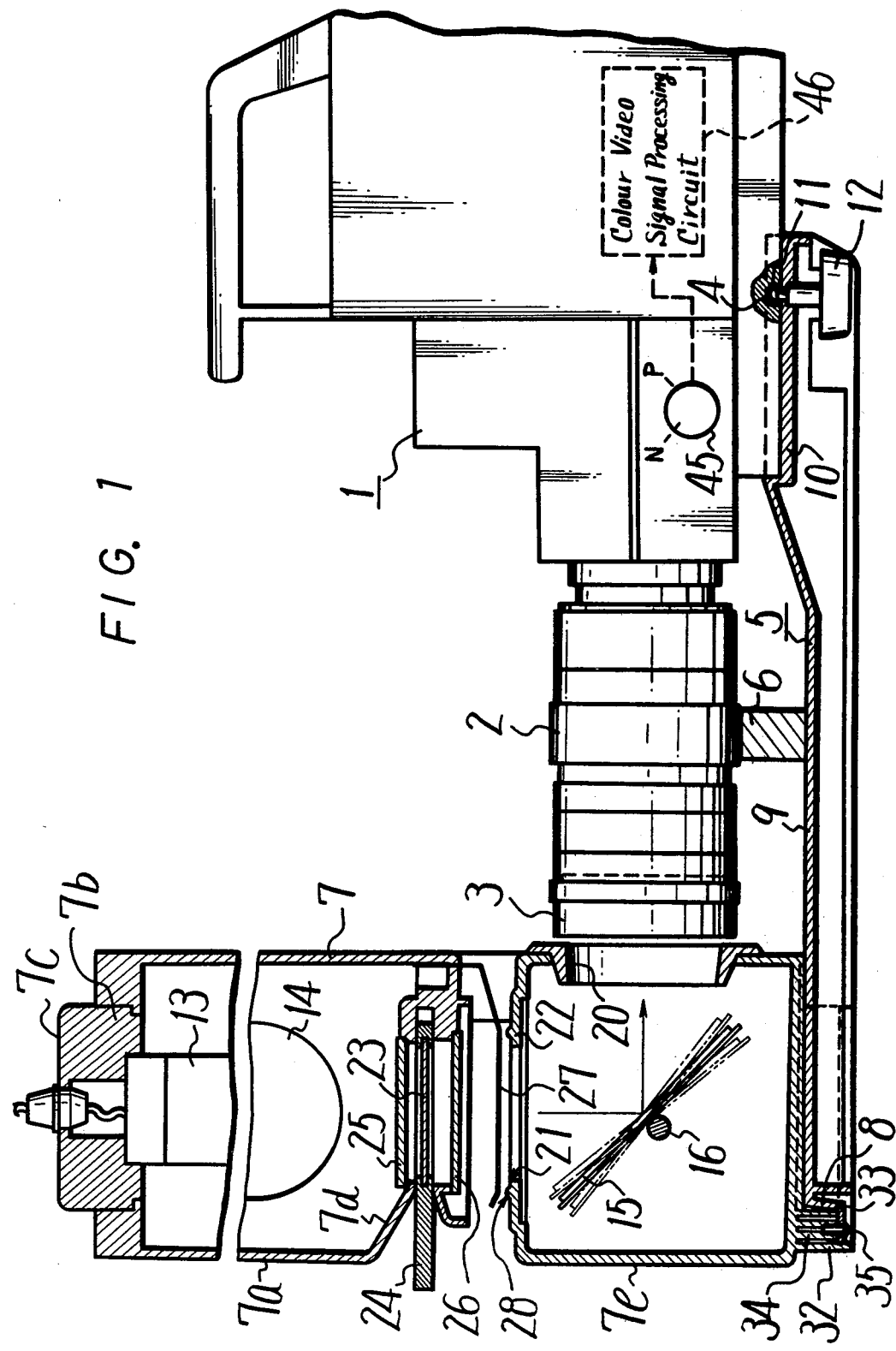
FIG. 1 is a part sectional view of an embodiment of negative to positive image converting apparatus according to the inventon with a video camera mounted thereon.

Referring first to FIG. 1, a video camera 1 with a lens mount 2 having an adaptor lens (close-up lens) 3 attached is located into a recess 10 at one end of a base member 5 and is secured in position by a screw bolt 11 which engages into a screw box 4 of the video camera 1 by a rotatable knob 12. The video camera 1 includes a negative/postive inversion switch 45 which is connected to a color video signal processing circuit 46, the operation of which will be described later. The adaptor lens 3 and the mount 2 may be supported by a resilient member 6 made from, for example, a felt material which is attached to the base member 5. At the other end of the base member 5 there is a cylindrically-shaped housing 7 having one end located onto the base member 5, the housing 7 comprising a lamp housing 7a in which is disposed, for example, a 60 watt lamp 14 which is supported by a lamp holder 13. The lamp holder 13 is attached to a detachable member 7b which is located at the upper end of the lamp housing 7a and comprises cooling fins 7c. The detachable member 7b and the fins 7c are ideally made from a good thermally-conducting material so that heat may be dissipated away from the lower part of the lamp housing 7a. At the lower end of the housing member 7a is a transparent but thermally-conducting member 25 which is located in a recess in the lower end of the housing 7a and adjacent to a shield portion 7d. The thermally-conducting member 25 assists heat dissipation away from apparatus disposed beneath the lamp housing 7a.

A mirror housing 7e which is part of the cylindrically shaped housing 7 is located onto the base member 5. The mirror housing 7e encloses a mirror 15 which is located on a rotatable shaft 16. The mirror 15 is externally rotatable about the shaft 16 which, if rotated through small angles, will have the effect of converging and diverging the verticals in the image of a film being projected. The mirror housing 7e has two apertures, a first aperture 21 which is located at the top end of the mirror housing 7e for allowing light to pass from the lamp housing 7a down to the mirror 15 located within the mirror housing 7e, and a second aperture 20 for allowing the light reflected by the mirror 15 to pass through the side of the mirror housing 7e and into the lens 3 on the video camera 1.

Disposed between the thermally-conducting member 25 and the first aperture 21 is a means for inserting color filters 23 in the light path, which are supported in a holder 24, the holder 24 being located in a slot in the lower part of the lamp housing 7a between the conducting member 25 and a diffuse glass plate 26. Below the filter 23 is located the diffuse glass plate 26 which serves to scatter the light originating from the lamp 14. A film spring plate 27, one end of which is fixed to the lamp housing 7a, is disposed in a space between the lamp housing 7a and the mirror housing 7e, the space providing room for a film holder 40 to be easily inserted in the path of light originating from the lamp 14. The spring plate 27 assists the location of the film holder 40 between projecting guide pins 28 and the first aperture 21. The lower part of the mirror housing 7e is shown mounted against an abutment flange 8 of the base member 5 which abuts against a portion 34 of the mirror housing 7e in a manner which will be described later.

Figure 2:
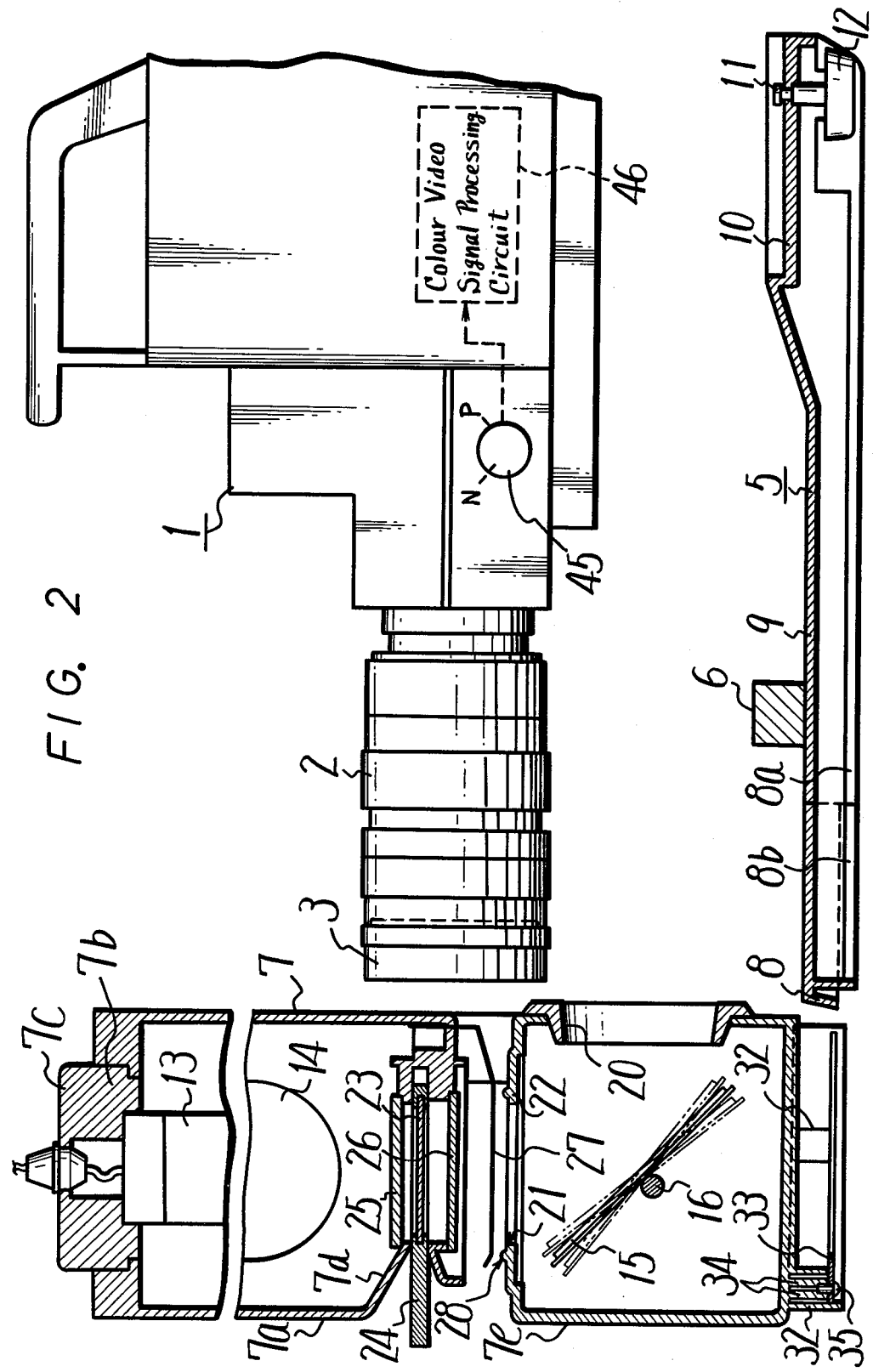
FIG. 2 is a view of the image converting apparatus of FIG. 1 when disassembled.

FIG. 2 shows how the cylindrically shaped housing 7, the base member 5 and the video camera 1 relate to one another before assembly.

Figure 3:
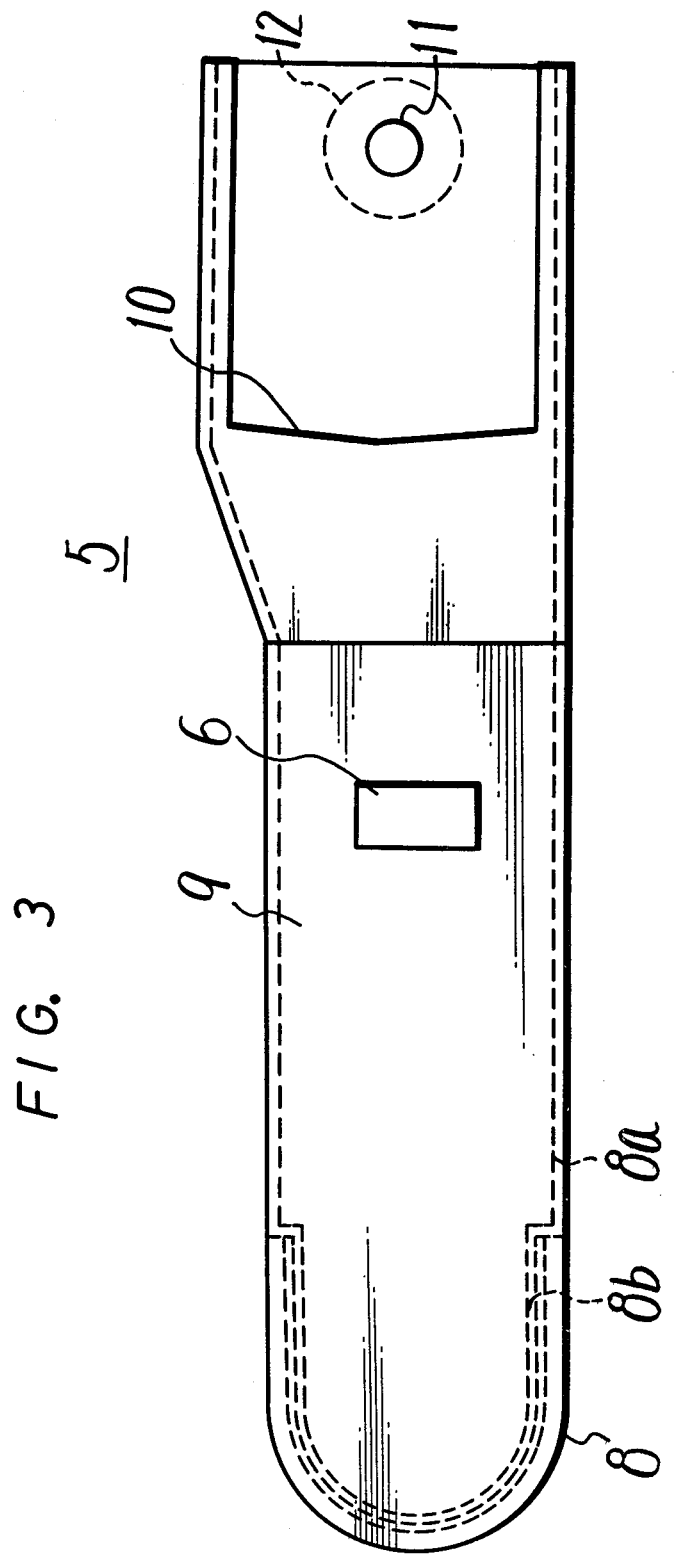
FIG. 3 is a plan view from above of a base member of the image converting apparatus of FIG. 1.
Figure 6:
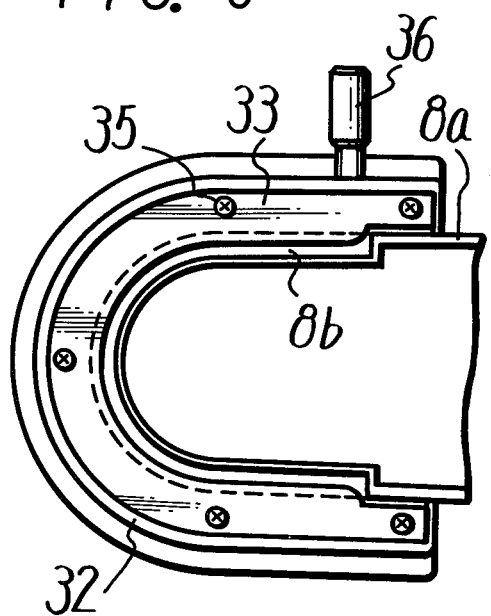
FIG. 6 is a plan view from below of the bottom part of the lamp and mirror housing in which the base member has been located.
Figure 5:
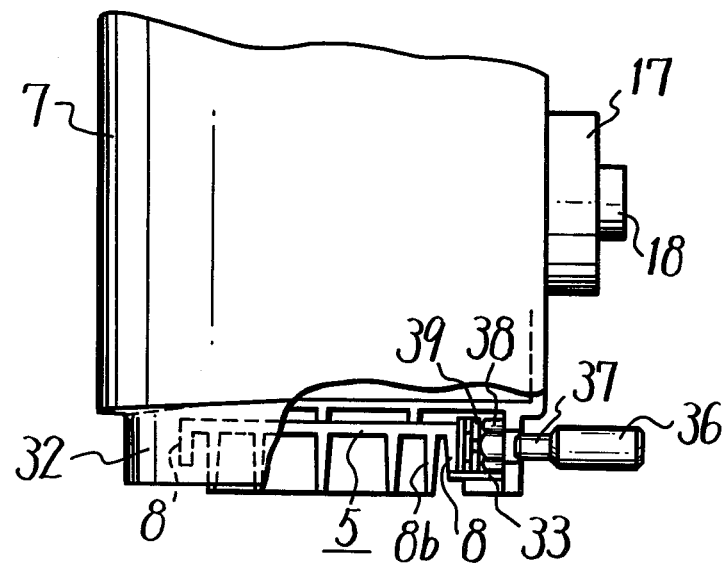
FIG. 5 is an end view of the base member and the lamp and mirror housing showing in detail a screw knob for engaging the lamp and mirror housing to the base member.

FIG. 3 is an above plan view of an example of the base member 5 showing the recess 10 where the video camera 1 is located, and also showing the location of the screw bolt 11 and the rotatable knob 12 by means of which the video camera 1 is fastened to the base member 5. A top flat portion 9 of the base member 5 extends from the end at which the cylindrically-shaped housing 7 is located to substantially two-thirds of the total length of the base member 5, the housing end of which is semi-circular in shape to conform to the cylindrical shape of the housing 7 with which it locates. The edge of the flat portion 9 comprises a flange 8a shown by dotted lines in FIG. 3, the flange 8a comprising substantially parallel sides which extend down in a vertical direction perpendicular to the flat portion 9 to a depth equal to that of the height of the base member 5 as illustrated in FIG. 5. At the housing end of the base member 5, the flange 8a is displaced inwardly of the flat face 9 as shown by a dotted line 8b in FIG. 3. This makes way for the abutment flange 8 which runs along the end edge of face 9 and is outwardly inclined with respect to the perpendicular to the flat portion 9. The lower edge of the abutment flange 8 rests on a plate 33 which is secured to the underside of the cylindrical housing 7 base by screws 35. The plate 33 is also semi-circular at one end to conform to the cylindrical shape of the housing 7 and also to the abutment flange 8. This results in an accurate engagement between the abutment flange 8 and the plate 33 of the underside of the housing 7 as illustrated in FIGS. 5 and 6. Furthermore, the base member 5 is located in a lateral direction by the contact of the abutment flange 8 against the portion 34 of the housing 7 as shown in FIG. 1.

Figure 4:
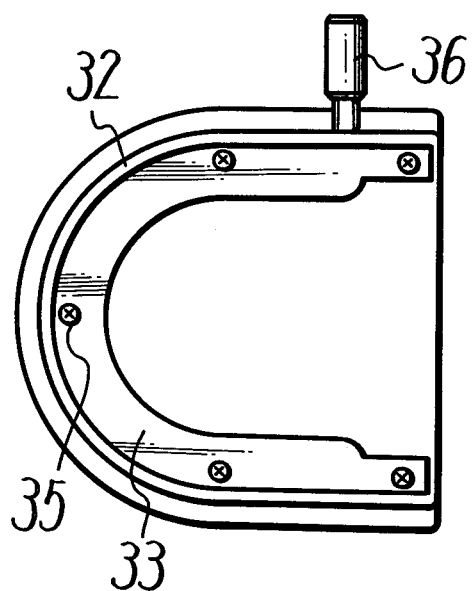
FIG. 4 is a plan view from below of the bottom part of a lamp and mirror housing in which the base member of the image converting apparatus of FIG. 1 is to be located.

FIGS. 4, 5 and 6 show a tightening knob 36 which is located between the plate 33 and the bottom face of the housing 7. By tightening the tightening knob 36 which comprises a threaded portion 37 running through a threaded nut 38, a plate 39 may be pushed up against a lower flange 32 of the housing 7 thus securing the housing 7 against the base member 5.

Figure 7:
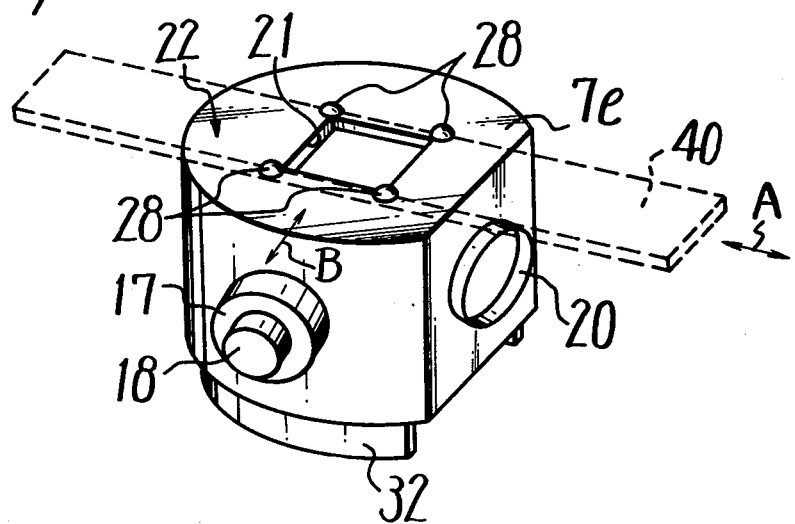
FIG. 7 is a perspective view of an example of a mirror housing.

FIG. 7 illustrates an example of a mirror housing 7e wherein the apertures 20 and 21 correspond to those in FIG. 1. Also shown in FIG. 7 are rotation knobs 17 and 18 which are connected to the shaft 16 thus enabling the mirror 15 to be externally rotated about the shaft 16 as shown in FIG. 1. As an alternative, the mirror 15 may be fixed with its general plane at 45° to the axis of the cylindrically-shaped housing 7. On the top surface of the mirror housing 7e are located the projecting guide pins 28 of, for example, a substantially hemispherical shape of radius 2 mm, which guide the film holder 40 over the aperture 21. The projecting guide pins 28 ensure that the film holder 40 may be easily located over the aperture 21 provided that they are spaced far enough apart for the holder 40 to move between them freely, thus enabling a negative 47 (a color or black and white film) to be moved relative to the aperture 21 so that any details to be zoomed in on by the video camera 1 may be at the centre of the picture. In this example, the projecting guide pins 28 are equally spaced so that the film holder 40 may be moved backwards or forwards over the aperture 21 in the direction shown by arrows A in FIG. 7, and may also be rotated about 90° so as to slide in directions shown by arrows B in FIG. 7.

Figure 8:
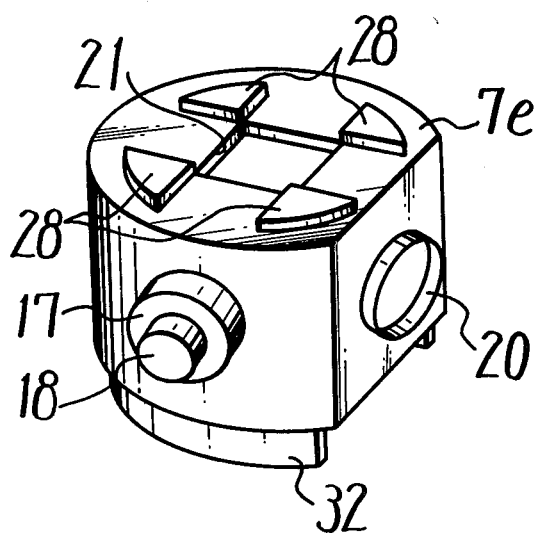
FIG. 8 is a perspective view of another example of a mirror housing.

FIG. 8 illustrates another example of a mirror housing 7e wherein the projecting guide pins 28 are of a more substantial structure than those of FIG. 7.

Figure 9:
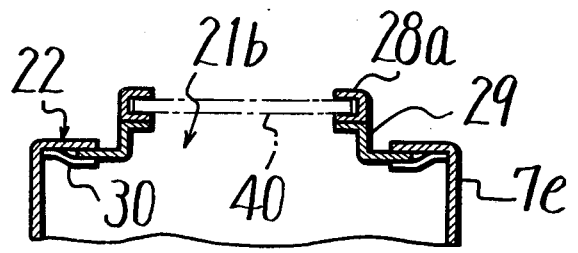
FIG. 9 is a sectional part view of a further example of a mirror housing.

FIG. 9 illustrates a further example of a mirror housing 7e wherein the housing 7e has a large circular aperture 21b and has a guiding means 28a for guiding the film holder 40 fixed to a base 29 which is rotatably supported between spring clips 30 and a circular housing flange 22. Alternatively, the base 29 may be rectangular in shape, and fixed by spring clips 30 in a square aperture (not shown), the film holder 40 being held in supporting means 28a rotatably mounted on the base 29.

Figure 10:
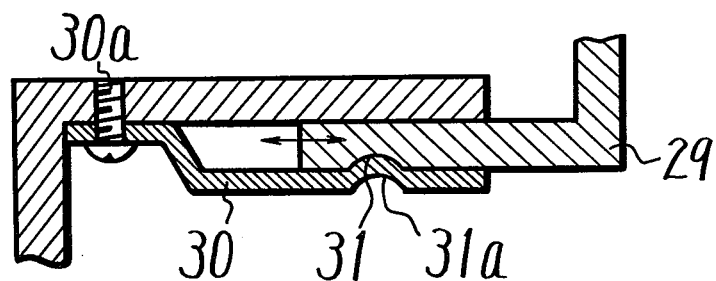
FIG. 10 is a detailed cross-sectional view of part of the mirror housing of FIG. 9.

FIG. 10 shows in detail a construction of the clip 30 and the disposition of the base 29 with respect to the housing flange 22. In the case where the base 29 is rotatably mounted in the aperture 21b, it may be desirable to locate precisely the base 29 in the plane of rotation. In this case, the base 29 has a rounded annular groove 31 on its lower lateral face which locates a corresponding annular projection or a series of hemispherical projections 31a arranged in an annular way in the clip 30. The clip 30 is secured to the mirror housing flange by a screw 30a, the shape of a clip 30 being such that an upward pressure is exerted onto the base 29 to keep it firmly in location.

Figure 11:
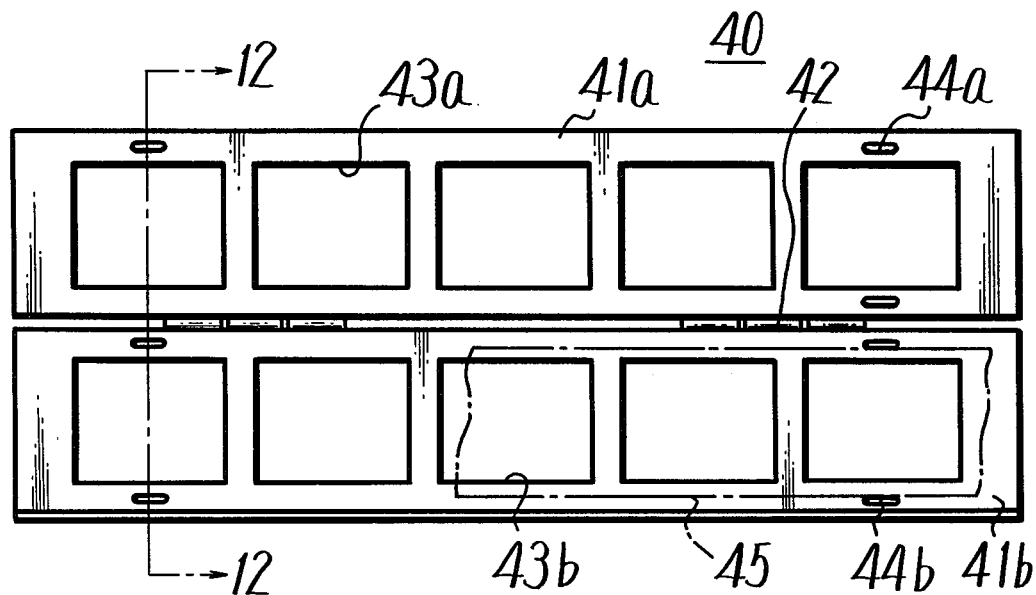
FIG. 11 is an example of a film holder to be located between the lamp housing and the mirror housing of the image converting apparatus of FIG. 1.

FIG. 11 is an example of the film holder 40 comprising an upper and lower frame 41a and 41b respectively, each having a plurality of windows 43a and 43b respectively of size appropriate to the film to be used. The frames have hinges 42 on one side so that the upper and lower frames 41a and 41b may be folded over one another, the upper frame having a plurality of projections 44a along its sides while the other frame has corresponding holes 44b disposed to receive the projections 44a. The projections 44a serve to guide the negative 47 when inserted into the holder 40.

Figure 12:
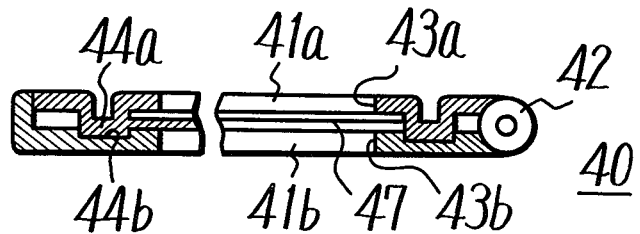
FIG. 12 is a sectional view of the film holder enclosing a film and taken along line 12—12 of FIG. 11.

FIG. 12 is a cross-sectional view taken along lines 12—12 of FIG. 11 of the two plates 41a and 41b when they are closed and have a negative 47 between them.

As previously described, the detachable member 7b and the fins 7c are made out of a thermally-conducting material for cooling purposes but the lamp holder 13 is preferably made from a plastics material. Although the remainder of the apparatus may be made out of a plastics material, either all or some of the components may be made out of metal, for example, the clip 30 and the screws 35.

The operation of the negative to positive image converting apparatus will be now be described in detail with reference to the accompanying drawings. The lamp 14 of the lamp housing 7a shines through the negative 47 which is secured in the holder 40, the holder 40 being secured between the spring plate 27 and the aperture 21 of the mirror housing 7e so that the image of the negative 47 is reflected off the mirror 15 and into the lens of the video camera 1 which supplies a television signal representing the image of the negative 47. The colors are reversed in a negative and for the video camera 1 to show a positive image, it is necessary to switch in a circuit to reverse the colors. This may be done by switching in a color video signal processing circuit 46 by a negative to positive inverter switch 45. The switching in of the circuit 46 changes the gamma compensation characteristics and the automatic gain control (AGC) semi-peak detection changes to peak detection. The switch also switches in a luminance signal (the signal determining the brightness and the individual color contributions of the signal) inverter and a chrominance signal (the signal added to the luminance signal to provide color information) inverter so that the signals which correspond to black in the negative 47 become white and vice versa, the colors are also changed to their inverse. When a positive, that is a transparency, is to be shown, then the switch 45 is simply switched to the positive position which switches out the circuit 46 and thus the colors of the image originating from the positive remain unchanged. Although the negative 47 has generally been taken to be a color film, a black and white negative may also be used in the above described arrangement. The video camera 1 may include color controls such as a hue control which may be adjusted to compensate for color casts of the negative 47 or positive, or alternatively color casts may be added to enhance particular color features of the negative 47. A hue control may also be used for compensating variations in the color of the base material on which the print 47 is made, as this frequently varies according to the particular type of film manufacture. Furthermore, the filters 23 may be changed to compensate for varying characteristics in the type of film used. An automatic gain control circuit in the video camera 1 is operative to compensate for dark and light negatives 47 and positives, and to adjust according to the quantity of light received by the camera.

The output signals which are representative of the image from the negative 47 may be transmitted to a television receiver to be displayed on the screen thereof or to a video tape recorder which may include an editor for adding information to the signal such as captions.

The embodiment according to the present invention as described above has the advantage that it has a compact and upright projection part which uses low power projection lamps, heat is kept well away from the video apparatus and lenses, it facilitates the easy changing of filters and may be used with many different types of film holder. The apparatus also has a negative to positive control switch for switching in the appropriate circuits according to whether a positive or negative print is to be projected. The switch 45 is operated manually in the above described embodiment but alternatively, the apparatus may comprise an automatic switch so that the signal processing circuit 46 may be switched into the appropriate image converting mode when the camera 1 is mounted onto the base member 5, for example by means of the rotatable knob 12. The apparatus also has the advantage that the video camera is easily detachable from the base of the apparatus and the base and housing part may themselves be separated for easy carrying and compact storage.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A negative to postive image converting apparatus comprising:
    a base member having first and second ends, said first end having provision for mounting a video camera thereon;
    a housing mounted substantially at right angles to said second end of said base member, said housing comprising a lamp housing wherein a lamp holder is disposed, a mirror housing wherein a mirror is disposed for reflecting light originating from said lamp housing to said video camera, and a space between said lamp housing and said mirror housing into which a negative film can be inserted.

2. A negative to positive image converting apparatus according to claim 1 further comprising a color filter means optionally provided in said light path to compensate for the characteristics of the base material of said negative film.

3. A negative to positive image converting apparatus according to claim 1 wherein guide means for guiding a film holder are provided on said mirror housing.

4. A negative to positive image converting apparatus according to claim 3 wherein said film holder can be inserted in either of two perpendicular directions in said guide means in the plane of said negative film.

5. A negative to positive image converting apparatus according to claim 1 wherein said mirror is rotatable manually from outside said mirror housing.

6. A negative to positive image converting apparatus according to claim 1 in combination with a video camera mounted thereon and comprising a negative to positive inversion switch for switching in or out a color signal processing circuit for negative to positive image conversion.

* * * * *